(12) United States Patent
Nadein et al.

(10) Patent No.: US 11,636,024 B2
(45) Date of Patent: Apr. 25, 2023

(54) SYSTEM AND METHOD FOR RISK-BASED TESTING

(71) Applicant: JPMorgan Chase Bank, N.A., New York, NY (US)

(72) Inventors: Alla Nadein, Englewood Cliffs, NJ (US); Dheeraj Kumar, Bangalore (IN); Saithulasiram Ramachandruni, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/090,153

(22) Filed: Nov. 5, 2020

(65) Prior Publication Data

US 2022/0138087 A1    May 5, 2022

(51) Int. Cl.
*G06F 11/36*    (2006.01)
*G06F 11/07*    (2006.01)
*G06F 11/30*    (2006.01)

(52) U.S. Cl.
CPC ........ *G06F 11/3684* (2013.01); *G06F 11/076* (2013.01); *G06F 11/3075* (2013.01); *G06F 11/3688* (2013.01); *G06F 11/3692* (2013.01)

(58) Field of Classification Search
CPC .............. G06F 11/3684; G06F 11/076; G06F 11/3075; G06F 11/3688; G06F 11/3692
See application file for complete search history.

(56) References Cited

U.S. PATENT DOCUMENTS

| 2017/0262361 A1* | 9/2017 | Francis | G06F 11/3672 |
| 2018/0024918 A1* | 1/2018 | Agarwal | G06F 3/048 |
| | | | 717/125 |
| 2021/0064515 A1* | 3/2021 | Xu | G06N 3/08 |
| 2021/0263728 A1* | 8/2021 | Farrier | G06F 11/3604 |

OTHER PUBLICATIONS

Alt, Patrick. Regression test suite selection and minimization based on feature modeling. MS thesis. 2016. (Year: 2016).*
Strandberg, Per Erik, et al. "Automated system-level regression test prioritization in a nutshell." IEEE Software 34.4 (2017): 30-37. (Year: 2017).*

* cited by examiner

*Primary Examiner* — S. Sough
*Assistant Examiner* — Joanne G Macasiano
(74) *Attorney, Agent, or Firm* — Greenblum & Bernstein, P.L.C.

(57) ABSTRACT

Various methods, apparatuses/systems, and media for automatic risk-based testing of an application are disclosed. A processor accesses a database to obtain data corresponding to a plurality of test results of test runs conducted over a certain period of time for a set of plurality of tests and data corresponding to a change set; generates historical data based on the data corresponding to the plurality of test results and the change set; assigns a test failing probability value for each test among the set of plurality of tests based on analyzing the historical data; identifies a first test whose assigned test failing probability value is below a predetermined threshold value; and filters out the identified first test from the set of plurality of tests whose assigned test failing probability value is below the predetermined threshold value so that the identified first test is not utilized for future test runs.

11 Claims, 9 Drawing Sheets

FIG. 5A (500A)

| | $T_1$ | $T_2$ | $T_3$ | $T_4$ | $T_5$ | $T_6$ |
|---|---|---|---|---|---|---|
| $R_m$ | F | F | P | F | P | F |
| $R_{m-1}$ | F | F | P | P | P | F |
| $R_{m-2}$ | P | F | P | F | P | P |
| $R_{m-3}$ | P | F | F | F | P | P |
| ... | ... | ... | ... | ... | ... | ... |
| $R_k$ | ... | ... | ... | ... | ... | ... |
| $F_{T_{R_{k...m}}}$ | 0.2 | 1 | 0.1 | 0.6 | 0.1 | 0.8 |

FIG. 5B (500B)

| | $T_1$ | $T_2$ | $T_3$ | $T_4$ | $T_5$ | $T_6$ |
|---|---|---|---|---|---|---|
| $R_m$ | F | F | P | P | P | F |
| $R_{m-1}$ | F | F | P | F | P | F |
| $R_{m-2}$ | P | F | P | F | P | P |
| $R_{m-3}$ | P | F | F | F | P | P |
| ... | ... | ... | ... | ... | ... | ... |
| $R_k$ | ... | ... | ... | ... | ... | ... |

| Repository | test run failures ($a_n$) | test runs ($A_n$) | L |
|---|---|---|---|
| Author_1 | Repo_A | 4 | 20 | 0.200 |
| Author_1 | Repo_B | 23 | 1000 | 0.023 |
| Author_2 | Repo_A | 3 | 6 | 0.500 |
| Author_3 | Repo_A | 7 | 100 | 0.070 |

SYSTEM AND METHOD FOR RISK-BASED TESTING

TECHNICAL FIELD

This disclosure generally relates to testing of software application, and, more particularly, to methods and apparatuses for implementing a risk-based testing module for determining tests that have never failed in a sufficiently large amount of executions and exclude them from functional testing in continuous integration.

BACKGROUND

As software application becomes increasingly more complex, testing such software application also becomes more complex as a large number of unique combinations of paths and modules may be tested for each program. The years-long advocacy for improving or maintaining patters in code submission rate (commits), peer reviews, and branching strategies may have positioned testing of such software application at the very core of today's Continuous Integration (CI). A CI platform may be faced with a problem of accumulating software with unmanageably large amount of integration tests. It may take hours and sometimes days to execute regression test suites. Once written, it may be very unlikely that a test is revised. Instead, new tests are written along with added or modified functionality making existing tests redundant and increasing the overall execution time. With time, the knowledge about functionality being tested may be lost yet the tests are being retained as a safeguard against regressions. As a result, such tests are not suitable to run in CI.

There appears to be two factors that may contribute to the growth of compute resources and time delays: (1) the linearly growing code submission rate; and (2) the size of the test pool that also has been growing linearly. As a result, it may prove to be not cost effective to run all test on each code commit.

Thus, there is a need to enable test execution—particularly post-unit-test—in CI to reduce test turnaround time and saving computational resources.

SUMMARY

The present disclosure, through one or more of its various aspects, embodiments, and/or specific features or sub-components, provides, among other features, various systems, servers, devices, methods, media, programs, and platforms for implementing an automatic risk-based testing module for determining tests that have never failed in a sufficiently large amount of executions and exclude them from functional testing in CI, thereby enabling test execution—particularly post-unit-test—in CI by reducing test turnaround time and saving computational resources, but the disclosure is not limited thereto.

According to an aspect of the present disclosure, a method for automatic risk-based testing of an application by utilizing one or more processors and one or more memories is disclosed. The method may include: accessing a database to obtain data corresponding to a plurality of test results of test runs conducted over a certain period of time for a set of plurality of tests and data corresponding to a change set; generating historical data based on the data corresponding to the plurality of test results and the change set, assigning a test failing probability value for each test among the set of plurality of tests based on analyzing the historical data; identifying a first test whose assigned test failing probability value is below a predetermined threshold value, and filtering out the identified first test from the set of plurality of tests whose assigned test failing probability value is below the predetermined threshold value so that the identified first test is not utilized for future test runs.

According to a further aspect of the present disclosure, the method may further include: identifying a second test whose assigned test failing probability value is above the predetermined threshold value; and maintaining the identified second test within the set of plurality of tests whose assigned test failing probability value is above the predetermined threshold value so that the identified second test can be utilized for the future test runs.

According to yet another aspect of the present disclosure, the method may further include: identifying a plurality of second tests each of whose assigned test failing probability value is above the predetermined threshold value; assigning a priority value to each test of the plurality of second tests, wherein the priority value is proportional to corresponding failure rate of each test of the plurality of second tests within the test runs conducted over the certain period of time; and running, for the future test runs, each test of the plurality of second tests according to an order of assigned priority value.

According to a further aspect of the present disclosure, the method may further include: running first, for the future test runs, the test of the plurality of second tests whose assigned priority value is the highest; and running last, for the future test runs, the test of the plurality of second tests whose assigned priority value is the lowest.

According to another aspect of the present disclosure, the method may further include: identifying a plurality of first tests whose assigned test failing probability value is approximately zero; and filtering out the identified plurality of first tests from the set of plurality of tests whose assigned test failing probability value is approximately zero so that the identified plurality of first tests are not utilized for the future test runs.

According to yet another aspect of the present disclosure, wherein the data corresponding to the plurality test results of the test runs include one or more of the following data: stack traces and execution times, types of test runners, and programming language the tests, but the disclosure is not limited thereto.

According to another aspect of the present disclosure, wherein the data corresponding to the change set includes one or more of the following: file names, commit types, and authors, but the disclosure is not limited thereto.

According to a further aspect of the present disclosure, a system for automatic risk-based testing of an application is disclosed. The system may include a database that stores data corresponding to a plurality of test results of test runs conducted over a certain period of time for a set of plurality of tests and data corresponding to a change set; and a processor operatively connected with the database via a communication network. The processor may be configured to: access the database to obtain the data corresponding to the plurality of test results of test runs conducted over the certain period of time for the set of plurality of tests and the data corresponding to the change set; generate historical data based on the data corresponding to the plurality of test results and the change set; assign a test failing probability value for each test among the set of plurality of tests based on analyzing the historical data; identify a first test whose assigned test failing probability value is below a predetermined threshold value, and filter out the identified first test from the set of plurality of tests whose assigned test failing probability value is below the predetermined threshold value so that the identified first test is not utilized for future test runs.

According to another aspect of the present disclosure, the processor may be further configured to: identify a second test whose assigned test failing probability value is above the predetermined threshold value; and maintain the identified second test within the set of plurality of tests whose assigned test failing probability value is above the predetermined threshold value so that the identified second test can be utilized for the future test runs.

According to yet another aspect of the present disclosure, the processor may be further configured to: identify a plurality of second tests each of whose assigned test failing probability value is above the predetermined threshold value; assign a priority value to each test of the plurality of second tests, wherein the priority value is proportional to corresponding failure rate of each test of the plurality of second tests within the test runs conducted over the certain period of time; and run, for the future test runs, each test of the plurality of second tests according to an order of assigned priority value.

According to an aspect of the present disclosure, wherein the processor may be further configured to: run first, for the future test runs, the test of the plurality of second tests whose assigned priority value is the highest, and run last, for the future test runs, the test of the plurality of second tests whose assigned priority value is the lowest.

According to a further aspect of the present disclosure, the processor may be further configured to: identify a plurality of first tests whose assigned test failing probability value is approximately zero; and filter out the identified plurality of first tests from the set of plurality of tests whose assigned test failing probability value is approximately zero so that the identified plurality of first tests are not utilized for the future test runs.

According to another aspect of the present disclosure, a non-transitory computer readable medium configured to store instructions for automatic risk-based testing of an application is disclosed. The instructions, when executed, may cause a processor to perform the following: accessing a database to obtain data corresponding to a plurality of test results of test runs conducted over a certain period of time for a set of plurality of tests and data corresponding to a change set; generating historical data based on the data corresponding to the plurality of test results and the change set; assigning a test failing probability value for each test among the set of plurality of tests based on analyzing the historical data; identifying a first test whose assigned test failing probability value is below a predetermined threshold value; and filtering out the identified first test from the set of plurality of tests whose assigned test failing probability value is below the predetermined threshold value so that the identified first test is not utilized for future test runs.

According to a further aspect of the present disclosure, when executed, the instructions may further cause the processor to perform the following: identifying a second test whose assigned test failing probability value is above the predetermined threshold value; and maintaining the identified second test within the set of plurality of tests whose assigned test failing probability value is above the predetermined threshold value so that the identified second test can be utilized for the future test runs.

According to another aspect of the present disclosure, when executed, the instructions may further cause the processor to perform the following: identifying a plurality of second tests each of whose assigned test failing probability value is above the predetermined threshold value; assigning a priority value to each test of the plurality of second tests, wherein the priority value is proportional to corresponding failure rate of each test of the plurality of second tests within the test runs conducted over the certain period of time; and running, for the future test runs, each test of the plurality of second tests according to an order of assigned priority value.

According to yet another aspect of the present disclosure, when executed, the instructions may further cause the processor to perform the following: running first, for the future test runs, the test of the plurality of second tests whose assigned priority value is the highest; and running last, for the future test runs, the test of the plurality of second tests whose assigned priority value is the lowest.

According to an additional aspect of the present disclosure, when executed, the instructions may further cause the processor to perform the following: identifying a plurality of first tests whose assigned test failing probability value is approximately zero; and filtering out the identified plurality of first tests from the set of plurality of tests whose assigned test failing probability value is approximately zero so that the identified plurality of first tests are not utilized for the future test runs.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5A illustrates an exemplary table listing assigned priority value in accordance with an exemplary embodiment.

FIG. 5B illustrates another exemplary table to determine which tests may be excluded in accordance with an exemplary embodiment.

DETAILED DESCRIPTION

Figure 1:
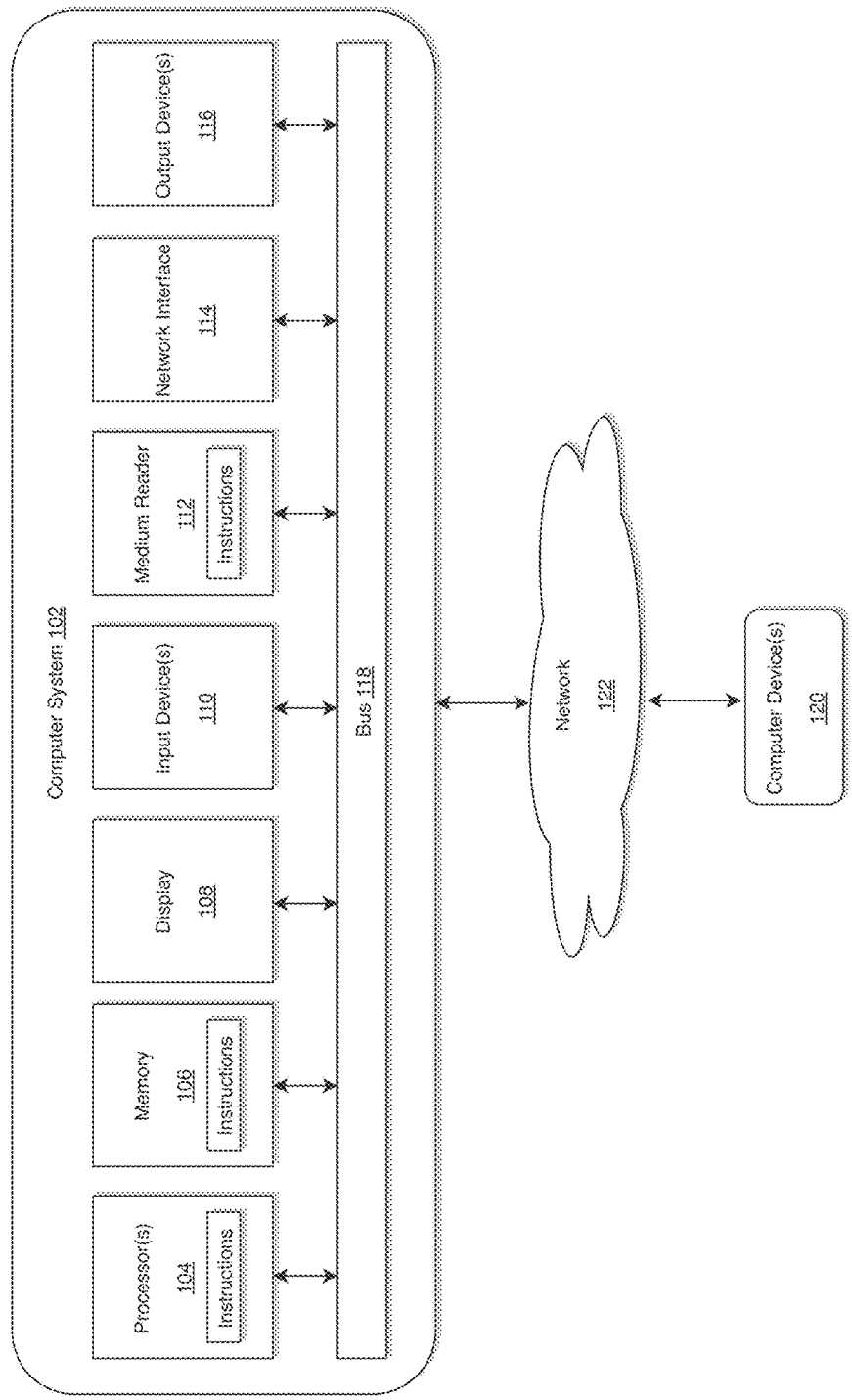
FIG. 1 illustrates a computer system for implementing an automatic risk-based testing module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPLU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing an automatic risk-based testing module for determining tests that have never failed in a sufficiently large amount of executions and exclude them from functional testing in CI, thereby enabling test execution—particularly post-unit-test—in CI by reducing test turnaround time and saving computational resources, but the disclosure is not limited thereto. As disclosed herein, the various aspects, embodiments, features, and/or sub-components may also provide optimized processes of implementing an automatic risk-based testing module that provides exclusionary analysis based on test effectiveness to limit regressive testing for streamlining testing in continuous delivery. By utilizing the automatic risk-based testing module of the instant disclosure, the continuous delivery may be facilitated by only running the regressions tests that are pertinent to the platform that have a probability of failure greater than zero (0), thereby making the regression testing possible in continuous delivery, but the disclosure is not limited thereto.

Figure 2:
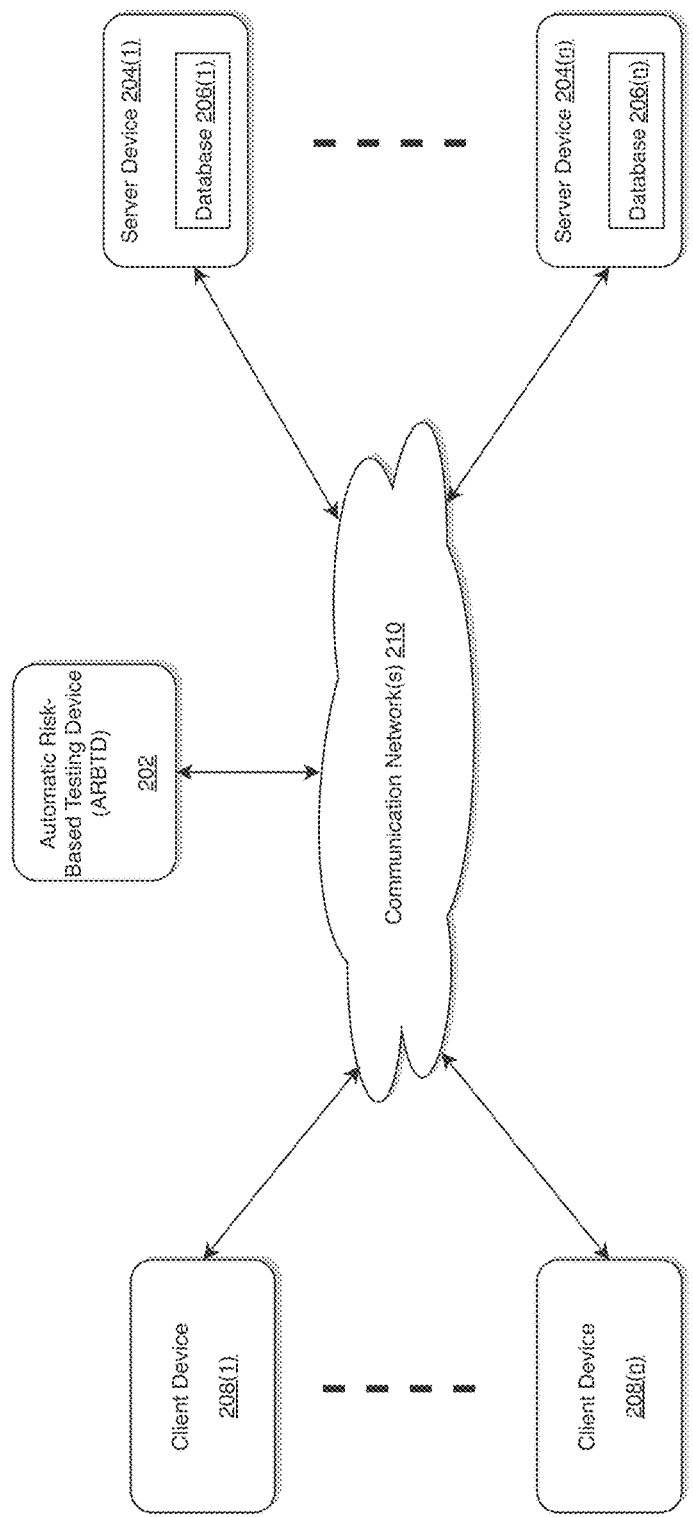
FIG. 2 illustrates an exemplary diagram of a network environment with an automatic risk-based testing device in accordance with an exemplary embodiment.

Referring to FIG. 2, a schematic of an exemplary network environment 200 for implementing an automatic risk-based testing device (ARBTD) of the instant disclosure is illustrated.

According to exemplary embodiments, the above-described problems associated with conventional testing system may be overcome by implementing an ARBTD 202 having an automatic risk-based testing module (not shown) as illustrated in FIG. 2 by determining tests that have never failed in a sufficiently large amount of executions and exclude them from functional testing in CI, thereby enabling test execution—particularly post-unit-test—in CI by reducing test turnaround time and saving computational resources, but the disclosure is not limited thereto, but the disclosure is not limited thereto.

The TBDD 202 may be the same or similar to the computer system 102 as described with respect to FIG. 1.

The ARBTD 202 may store one or more applications that can include executable instructions that, when executed by the ARBTD 202, cause the ARBTD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ARBTD 202 itself, may be located in virtual server(s) running in a cloud-based computing environment rather than being tied to one or more specific physical network computing devices. Also, the application(s) may be running in one or more virtual machines (VMs) executing on the ARBTD 202. Additionally, in one or more embodiments of this technology, virtual machine(s) running on the ARBTD 202 may be managed or supervised by a hypervisor.

In the network environment 200 of FIG. 2, the ARBTD 202 is coupled to a plurality of server devices 204(1)-204(n) that hosts a plurality of databases 206(1)-206(n), and also to a plurality of client devices 208(1)-208(n) via communication network(s) 210. A communication interface of the ARBTD 202, such as the network interface 114 of the computer system 102 of FIG. 1, operatively couples and communicates between the ARBTD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ARBTD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ARBTD 202 may be a standalone device or integrated with one or more other devices or apparatuses, such as one or more of the server devices 204(1)-204(n), for example. In one particular example, the ARBTD 202 may be hosted by one of the server devices 204(1)-204(n), and other arrangements are also possible. Moreover, one or more of the devices of the ARBTD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ARBTD 202 via the communication network(s) 210 according to the HTTP-based and/or JavaScript Object Notation (JSON) protocol, for example, although other protocols may also be used.

The server devices 204(l)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ARBTD 202 that may be configured for determining tests that have never failed in a sufficiently large amount of executions and exclude them from functional testing in CI, thereby enabling test execution—particularly post-unittest—in CI by reducing test turnaround time and saving computational resources, but the disclosure is not limited thereto. For example, according to exemplary embodiments, the client devices 208(1)-208(n) in this example may include any type of computing device that can facilitate the implementation of the ARBTD 202 that may be configured for providing exclusionary analysis based on test effectiveness to limit regressive testing for streamlining testing in continuous delivery, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the ARBTD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ARBTD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ARBTD 202, the server devices 204(1)-204(n), or the client devices 208(1)-208(n), for example, may be configured to operate as virtual instances on the same physical machine. For example, one or more of the ARBTD 202, the server devices 204(1)-204(n), or the client devices 208(1)-208(n) may operate on the same physical device rather than as separate devices communicating through communication network(s) 210. Additionally, there may be more or fewer ARBTDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
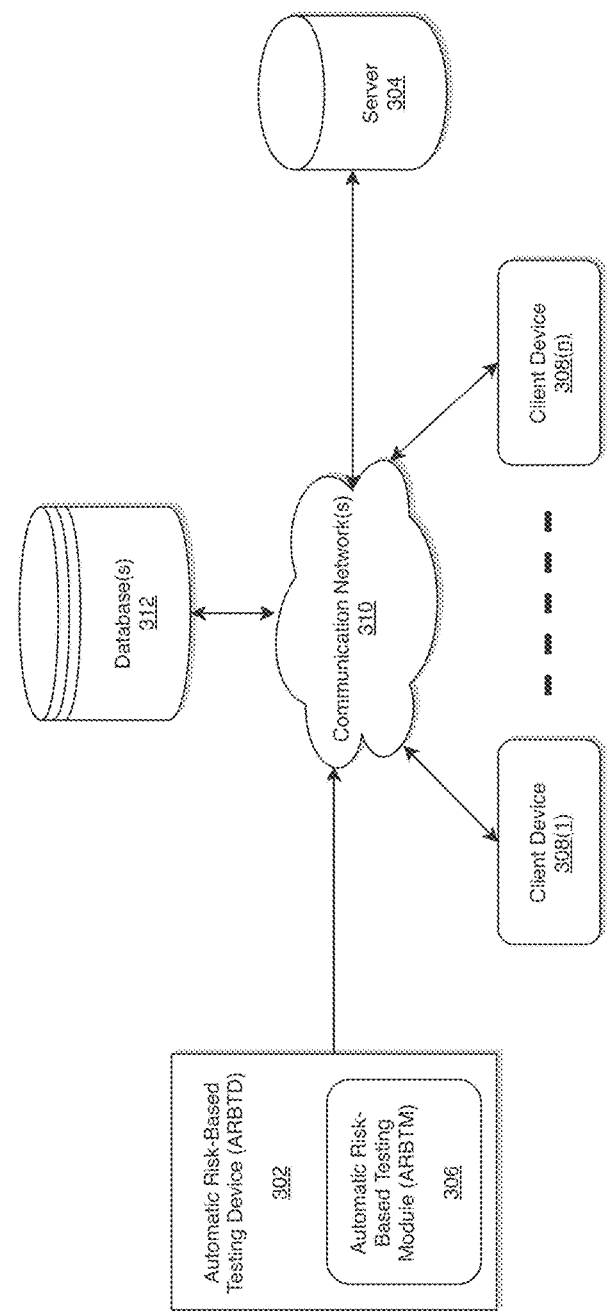
FIG. 3 illustrates a system diagram for implementing an automatic risk-based testing device with an automatic risk-based testing module in accordance with an exemplary embodiment.

FIG. 3 illustrates a system diagram for implementing an automatic risk-based testing (ARBTD) with an automatic risk-based testing module (ARBTM) in accordance with an exemplary embodiment.

As illustrated in FIG. 3, the ARBTD 302 including the ARBTM 306 may be connected to a server 304, and a database(s) 312 via a communication network 310. The ARBTD 302 may also be connected to a plurality of client devices 308(1)-308(n) via the communication network 310, but the disclosure is not limited thereto. According to exemplary embodiments, the ARBTM 306 may be implemented within the client devices 308(1)-308(n), but the disclosure is not limited thereto. According to exemplary embodiments, the client devices 308(1)-308(n) may be utilized for software application testing, but the disclosure is not limited thereto.

According to exemplary embodiment, the ARBTD 302 is described and shown in FIG. 3 as including the ARBTM 306, although it may include other rules, policies, modules, databases, or applications, for example. According to exemplary embodiments, the database(s) 312 may be embedded within the ARBTD 302. Although only one database(s) 312 is illustrated in FIG. 3, according to exemplary embodiments, a plurality of database(s) 312 may be provided. The database(s) 312 may include one or more memories configured to store information including: rules, programs, production requirements, configurable threshold values defined by a product team to validate against service level objective (SLO), machine learning cadence model, machine learning behavior model, log data, hash values, etc., but the disclosure is not limited thereto. According to exemplary embodiments, the ARBTM 306 may be configured to be storage platform agnostic—configured to be deployed across multiple storage layers and may include data corresponding to a plurality of test results of test runs conducted over a certain period of time for a set of plurality of tests and data corresponding to a change set, but the disclosure is not limited thereto.

According to exemplary embodiments, the ARBTM 306 may be configured to receive continuous feed of data from the database(s) 312 via the communication network 310.

As will be described below, the ARBTM 306 may be configured to access the database to obtain the data corresponding to the plurality of test results of test runs conducted over the certain period of time for the set of plurality of tests and the data corresponding to the change set, generate historical data based on the data corresponding to the plurality of test results and the change set; assign a test failing probability value for each test among the set of plurality of tests based on analyzing the historical data; identify a first test whose assigned test failing probability value is below a predetermined threshold value; and filter out the identified first test from the set of plurality of tests whose assigned test failing probability value is below the predetermined threshold value so that the identified first test is not utilized for future test runs, but the disclosure is not limited thereto.

The plurality of client devices 308(1)-308(n) are illustrated as being in communication with the ARBTD 302. In this regard, the plurality of client devices 308(1)-308(n) may be "clients" of the ARBTD 302 and are described herein as such. Nevertheless, it is to be known and understood that the plurality of client devices 308(1)-308(n) need not necessarily be "clients" of the ARBTD 302, or any entity described in association therewith herein. Any additional or alternative relationship may exist between either or more of the plurality of client devices 308(1)-308(n) and the ARBTD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the ARBTD 302 via broadband or cellular communication. Of course, these embodiments are merely exemplary and are not limiting or exhaustive.

Figure 4:
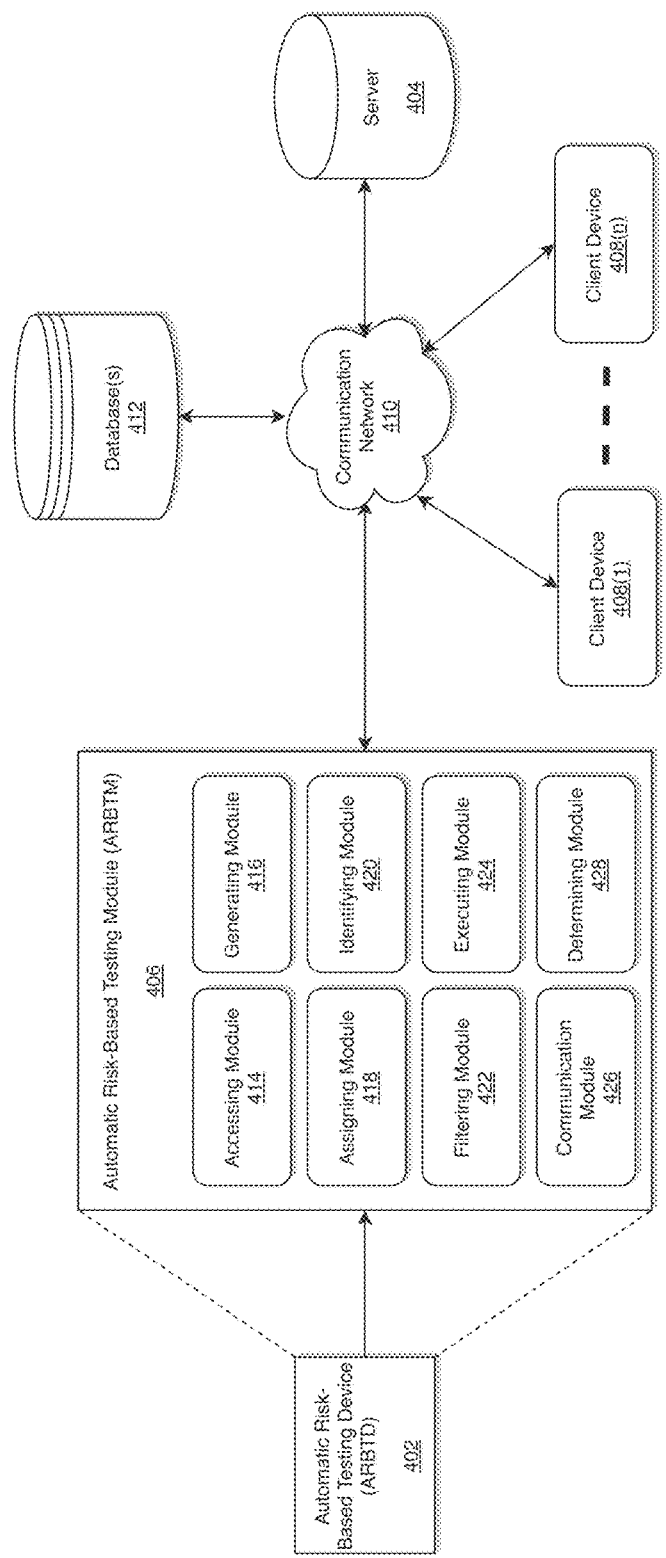
FIG. 4 illustrates a system diagram for implementing an automatic risk-based testing module of FIG. 3 in accordance with an exemplary embodiment.

FIG. 4 illustrates a system diagram for implementing an automatic risk-based testing module of FIG. 3 in accordance with an exemplary embodiment. As illustrated in FIG. 4, the system 400 may include an automatic risk-based testing device (ARBTD) 402 within which an automatic risk-based testing module (ARBTM) 406 may be embedded, a database(s) 412, a server 404, client devices 408(1)-408(n), and a communication network 410. According to exemplary embodiments, the ARBTD 402, ARBTM 406, database(s) 412, the server 404, the client devices 408(1)-408(n), and the communication network 410 as illustrated in FIG. 4 may be the same or similar to the ARBTD 302, the ARBTM 306, the database(s) 312, the server 304, the client devices 308(1)-308(n), and the communication network 310, respectively, as illustrated in FIG. 3.

As illustrated in FIG. 4, the ARBTM 406 may include accessing module 414, a generating module 416, an assigning module 418, an identifying module 420, a filtering module 422, an executing module 424, a communication module 426, and a determining module 428. According to exemplary embodiments, the database(s) 412 may be external to the ARBTD 402 may include various systems that are managed and operated by an organization. Alternatively, according to exemplary embodiments, the database(s) 412 may be embedded within the ARBTD 402 and/or the ARBTM 406.

The process may be executed via the communication network 410, which may comprise plural networks as described above. For example, in an exemplary embodiment, the various components of the ARBTM 406 may communicate with the server 404, and the database(s) 412 via the communication network 410 and the communication module 426. Of course, these embodiments are merely exemplary and are not limiting or exhaustive.

According to exemplary embodiments, the communication network 410 and the communication module 426 may be configured to establish a link between the database(s) 412, the client devices 408(1)-408(n) and the ARBTM 406.

According to exemplary embodiments, each of the accessing module 414, generating module 416, assigning module 418, identifying module 420, filtering module 422, executing module 424, communication module 426, and the determining module 428 may be implemented by microprocessors or similar, they may be programmed using software (e.g., microcode) to perform various functions discussed herein and may optionally be driven by firmware and/or software. Alternatively, each of the accessing module 414, generating module 416, assigning module 418, identifying module 420, filtering module 422, executing module 424, communication module 426, and the determining module 428 may be implemented by dedicated hardware, or as a combination of dedicated hardware to perform some functions and a processor (e.g., one or more programmed microprocessors and associated circuitry) to perform other functions. Also, according to exemplary embodiments, each of the accessing module 414, generating module 416, assigning module 418, identifying module 420, filtering module 422, executing module 424, communication module 426, and the determining module 428 may be physically separated into two or more interacting and discrete blocks, units, devices, and/or modules without departing from the scope of the inventive concepts.

According to exemplary embodiments, the accessing module 414 may be configured to access the database(s) 412 to obtain data corresponding to a plurality of test results of test runs conducted over a certain period of time for a set of plurality of tests and data corresponding to a change set. According to exemplary embodiments, the data corresponding to the plurality test results of the test runs include one or more of the following data: stack traces and execution times, types of test runners, and programming language the tests, but the disclosure is not limited thereto. According to exemplary embodiments, the data corresponding to the change set includes one or more of the following: file names, commit types, and authors, but the disclosure is not limited thereto.

According to exemplary embodiments the generating module 416 may be configured to generate historical data based on the data corresponding to the plurality of test results and the change set and the assigning module 418 may be configured to assign a test failing probability value for each test among the set of plurality of tests based on analyzing the historical data.

According to exemplary embodiments, the identifying module 420 may be configured to identify a first test whose assigned test failing probability value is below a predetermined threshold value and the filtering module 422 may be configured to filter out the identified first test from the set of plurality of tests whose assigned test failing probability value is below the predetermined threshold value so that the identified first test is not utilized for future test runs.

According to exemplary embodiments, the identifying module 420 may be further configured to identify a second test whose assigned test failing probability value is above the predetermined threshold value, and the executing module 424 may be configured to maintain the identified second test within the set of plurality of tests whose assigned test failing probability value is above the predetermined threshold value so that the identified second test can be utilized for the future test runs. According to exemplary embodiments, the determining module 428 may be configured to determine whether the assigned test failing probability value is above or below the predetermined threshold value.

According to exemplary embodiments, the identifying module 420 may also be configured to identify a plurality of second tests each of whose assigned test failing probability value is above the predetermined threshold value. The assigning module 418 may be configured to assign a priority value to each test of the plurality of second tests, wherein the priority value is proportional to corresponding failure rate of each test of the plurality of second tests within the test runs conducted over the certain period of time. The executing module 424 may be configured to run, for the future test runs, each test of the plurality of second tests according to an order of assigned priority value.

According to exemplary embodiments, the executing module 424 may also be configured to firstly run, for the future test runs, the test of the plurality of second tests whose assigned priority value is the highest and lastly run, for the future test runs, the test of the plurality of second tests whose assigned priority value is the lowest.

According to exemplary embodiments, the identifying module 420 may be configured to identify a plurality of first tests whose assigned test failing probability value is approximately zero, and the filtering module 422 may be configured to filter out the identified plurality of first tests from the set of plurality of tests whose assigned test failing probability value is approximately zero so that the identified plurality of first tests are not utilized for the future test runs.

FIGS. 5A, 5B, 6, 7A, 7B, 8, and 9 provide further details of how the ARBTM 406 enables test execution—particularly post-unit-test—in CI by reducing test turnaround time and saving computational resources. The ARBTM 406 may utilize the approach on (1) detecting the probability of a test failure and (2) prioritizing execution of tests based on their tendency to fail.

The ARBTM 406 may be configured to test execution prioritization algorithm. There may be opportunities to identify tests that almost never fail. One can save significant resources if such tests are executed less frequently than other more likely to fail tests. The ARBTM 406 may be configured to understand the probability of a failure in the likely-to-fail population and prioritize execution of failure-prone tests over those that are less likely to fail, thereby greatly decreasing the lag time between code commits and test result feedback to developers. Having a general understanding of these two populations may help to distill test results data into actionable items that inform developers, while they write code, of the impact of their changes on quality.

To this end, the ARBTM 406 may utilize analyses of number of points that in order to improve test execution in CI and to gain valuable insight into code development and testing practices.

Point 1: In a sufficiently large number of executions, a vast majority of tests never fail even once. The number of ever-passing tests may be larger than the number of likely-to-fail ones.

This is due to the practical difficulties in keeping existing tests up to date with new code changes and it's usually a common practice to introduce new tests with a code change. Some of the reasons for this may be due to poorly written tests that lack asserts, tests that execute only "happy path" or minimally required functionality, tests that address code that hasn't been changed for a while, or cover code that is not in use any longer. To filter out the "ever green" tests (tests that never fail), the ARBTM 406 analyzes the overall (historic) test failure rate. To be precise, the ARBTM 406 inspects the trend in the individual test failure rate $R_f$ in the entire history of test runs. The falling trend indicates that the recent test runs predominantly pass. The rising trend indicates the opposite. Let's define the overall trend as A, a simple ratio of failed $R_f$ vs total runs R:

$$A = \sum_{n}^{} R_f \div \sum_{n}^{} R$$

The ARBTM 406 may skip all tests with a low A that is steadily trending towards 0 over the total number of test runs.

However, A doesn't take into account the fact that recent test failures carry more importance than the early ones. Hence, another metric may be introduced in addition to A to prioritize those tests that the ARBTM 406 will run.

Point 2: A chance of a test failure may reduce as the test ages.

Most tests, once successfully passing, are modified infrequently and eventually become entirely ineffective while their overall failure rate remains above 0 slowly trending downwards. That leads to a conclusion that the overall trend in test failure rates A is misleading and may need a better way to identify tests with realistic probability of a failure.

The ARBTM 404 may also assign a priority value to a test so that it can execute high-value tests first. See, e.g., table 500A in FIG. 5A.

To address this, another metric S is introduced. This metric S is an ordered collection of tests that failed at least once within the last k runs. The ARBTM 406 bases the selection and prioritization algorithm on (1) the recent test failure rate and (2) failures in the last completed run as illustrated in FIG. 5A. The prioritized set S is an ordered collection of all tests in C and B defined as:

$$S = C + B - C \cap B$$

The ARBTM 406 utilizes the algorithm on the recent test failure rate and results of the last completed run.

1. Tests with Recent Failure Trend Greater than Zero (0)

The ARBTM 406 may inspect the trend in the k most recent test suite runs, where k is an arbitrary number that is constant for all tests within a test suite with the number of runs>=k. For tests that were introduced less than k runs ago, the ARBTM 406 uses the total number of their runs as k, k can vary per test suite. If F is defined as a test failure rate, then the rate as a ratio of number of failures to the total number of test runs may be defined as follows:

$$F_T = \sum_{n-k}^{n} R_f \div \left( \sum_{n-k}^{n} R_f + \sum_{n-k}^{n} R_s \right)$$

Let B be a set of all tests 1, 2, d ordered by F $$B = \{T_1, \ldots, T_d\} \text{ where}, F > 0, F_{T_1} > \ldots > F_{T_d}$$

To exclude the retired (removed or disabled) tests from the set, the ARBTM 406 may include only tests that exist in the $n^{th}$ run.

2. Tests with Failures in the Most Recent Run

Let C be a set of all tests 1, 2, ..., h that failed in the most recent run R $$C = \{T_1, \ldots, T_h\}$$

To order C, the ARBTM 406 may consider an arbitrary number m (m<k) of consecutive runs that immediately precede R. The ARBTM 406 may first order the tests by the number of consecutive failures within these m runs beginning with R. To prioritize tests with equal number of consecutive failures, the ARBTM 406 may consider their F.

For the table 500A as illustrated in 5A, the intermediate state of set $C = \{T_2, T_1, T_6, T_5\}$. To determine the priority of $\{T_1, T_6\}$, the ARBTM 406 may consider their failure rate in the last k runs $$F_{T_{R_{k->1}}}.$$

The final set $C = \{T_2, T_6, T_1, T_5\}$

Again, when the prioritized set S is represented as an ordered collection of all tests in C and B, the ARBTM 406 may define the test prioritization rule as:

$$S = C + B - C \cap B$$

Verifying the Algorithm

The ARBTM 406 may also be configured to analyze the overall (historic) test failure rate. According to exemplary embodiments, the ARBTM 406 may inspect the trend in the failure rate in the entire history of test runs. The falling trend may indicate that the recent test runs predominantly pass.

The rising trend may indicate the opposite. If A is define the overall trend, a simple ratio of failed vs total runs may be defined as follows:

$$A = \Sigma R_f \div (\Sigma R_f + \Sigma R_s)$$

Defining Failure Rate
1. The ARBTM 406 may inspect the trend in the k most recent test suite runs, k may represent an arbitrary number that is constant for all tests within a test suite with total number of test runs n>=k. For tests that were introduced less than k runs ago, the ARBTM 406 may use the total number of their runs as k, k can vary per test suite. Let F represent the test failure rate. The rate may be defined as a ratio of number of failures to k test runs out of n total test runs.

Let $H(T_{i,j})$ represent the pass or failure status (represented as 0 or 1 respectively) of the $j^{th}$ run of test i.

$$H(T_{i,j}) = \begin{cases} \text{if } T_{i,j} \text{ failed: } 1 \\ \text{else: } 0 \end{cases}$$

Let $F_{n,k}(T_i)$ represent the failure rate of the $n^{th}$ run considering the k most recent test runs of test i.

$$F_{n,k}(T_i) = \frac{\sum_{j=n-k}^{n} H(T_{i,j})}{k}$$

Let A be the set of all tests $\{T_1, T_2, \ldots, T_d\}$ for the $n^{th}$ run ordered by $F_{n,k}(T_d)$ $$A = \{T_1, \ldots, T_d\} \text{ where}, F > 0, F_{n,k}(T_1) > F_{n,k}(T_2) \ldots > F_{n,k}(T_d)$$

The above statement ensures that retired (removed or disabled) tests are not included in A, but only tests that exists in the $n^{th}$ run.

The ARBTM 406 may be configured to generically apply $F_{n,k}(T_i)$ to determine the overall or "all time" test failure rate if k=n is chosen.

2. The following describes a generalized approach to prioritizing resent test failures.

The above metric $F_{n,k}(T_i)$ represents the overall failure rate considering the past k runs of n total runs. But, this metric alone may not shed light on the importance of the failures that occurred across k runs. For example, a test case could have $F_{1000, 100}(T_i)=0.70$ indicating that out of the past 100 runs, this test case has failed 70 times. This information alone may not indicate if those failures occurred more recently or way in the past. The test case could have failed the first 70 runs while for the last 30 the test case ran successfully. Therefore, tests that have failed more recently should take higher priority when compared to those having failed a long while ago. To represent this relationship the following is taken into consideration by the ARBTM 406.

First, the ARBTM 406 may define initial weight vector W which is a linear vector representing all integer values from 1 to k as follows:

$$W = \{1, 2, \ldots, k\} \text{ where,}$$

weight of $T_{i,n-k}=1$, weight of $T_{i,n-k+1}=2, \ldots$, weight of $T_{i,n-1}=k$ This explains that each index of W represents the weight of the corresponding run of the observed test case. Here, the ARBTM 406 utilizes the past k runs of test case i. Therefore, the first index of W is the weight of the $(n-k)^{th}$ run of test case i and each subsequent index of W is the weight of all runs of test case i up until the $(n-1)^{st}$ run.

Again, the main goal of this weight vector may be to represent the importance of test cases that have failed more recently, but the disclosure is not limited thereto. Therefore, test cases which failed a long time ago and those which have passed should yield smaller values. This definition accomplishes both, but following example should be taken into consideration.

For example for considering n=100 total runs, k=20 most recent runs of a given test case, a weight vector would have been represented as follows:

$$W = \{w_{80}=1, w_{81}=2, w_{83}=3, \ldots, w_{99}=20\}$$

Consider the example above. Summing over the first 10 runs of W the total weight=55 may be derived indicating that the failures of these 10 runs are substantially more important than the failure in our most recent run. This may not be the way in which one intended to represent the relationship between test failure importance and time. This relationship appears perfectly linear. One would like to describe a relationship wherein tests failing more recently are weighted more than tests that failed a long time ago. Therefore, an exponential relationship between the importance of a test failure and time is assumed. Furthermore, the weight vector may be normalized to allow considering each weight value as a probability. To achieve this, the ARBTM 406 may implement the following:

The ARBTM 406, according to exemplary embodiments, may use the softmax function defined as (k and K are not the same as above):

$$\sigma(z)_j = \frac{e^{z_j}}{\sum_{k=1}^{K} e^{z_k}} \text{ for } j = 1, \ldots, K \text{ and } z = (z_1, \ldots Z_k)$$

That is, the ARBTM 406 applies the standard exponential function to each $z_j$ element of the input vector z and normalizes the values by dividing by the sum of all these exponentials, thereby ensuring that the sum of the components of the output vector $\sigma(z)$ is 1 (source).

The ARBTM 406 then applies the softmax function to the weight vector W. This newly created weight vector may be represented as W' as follows:

$$W' = \sigma(W)$$

The ARBTM 406 may now define the vector X which represents if test case i has failed during the past k runs. The vector may only contain {0, 1} (pass=0, fail=1) based on whether or not the test case failed for that given run and will have length=k.

$$X = \{H(T_{i,(n-k)}), \ldots, H(T_{i,(n-1)})\} \text{ where}, H(T_{i,j}) \text{ was defined above.}$$

The ARBTM 406 may, by utilizing the normalized weight vector W' and X (pass/fail indicator vector), define the final weight vector simply by taking the entry-wise product of vectors W' and X as follows.

$$W'' = W' \cdot X$$

That is, the ARBTM 406 is projecting the pass/fail vector onto the normalized weight vector to only pull out weight values for test runs which have failed, thereby discarding or penalizing for passed test cases while retaining the relationship that test runs which failed longer in the past should have less weight than those which have failed more recently.

Based on the derived weight vector for input values of n and k for a given test case, the ARBTM 406 may utilize it to derive the metric for relative importance of such test case which will advise one to deprioritize or completely exclude a test from being executed. To determine relative importance, the ARBTM 406 may sum the values of the weight vector W'''. According to exemplary embodiments, ARBTM 406 can define the importance as the "density of test failure" $D_{n,k}$ as follows:

$$D_{n,k}(T_i) = \sum_0^k W'''$$

According to exemplary embodiments, first, the ARBTM 406 derives $F_{n,k}(T_i)$ which represents the overall failure rate of an input test case for the past k test suite runs of n total runs. This metric may indicate that at a high level how often does this test signal a defect within the code base. But, it may not indicate the relative importance of those failures. Next, the ARBTM 406 derives $D_{n,k}(T_i)$ which indicates the "failure density" of a test case. This metric may give use a value between 0 and 1 yielding higher values if a test case has failed more recently. Further, the combination of frequent failures and those failures occurring more recently yields higher values. It also penalizes test case runs which have passed and those which have failed longer in the past.

Let B be the set of all tests $\{T_1, T_2, \ldots, T_d\}$ for the $n^{th}$ run ordered by $D_{n,k}(T_d)$ $B=\{T_1, \ldots, T_d\}$ where, $D>0, D_{n,k}(T_1)>D_{n,k}(T_2)\ldots>D_{n,k}(T_d)$ Now given sets A and B from above, there are a variety of conclusions one can make. For example, the ARBTM 406 may compare each set and use set operations to derive an output set of prioritized tests. The ARBTM 406 may define threshold values for $D_{n,k}(T_d)$ and $F_{n,k}(T_d)$ where tests may simply be excluded which violate the empirically defined thresholds. For example see the table 500B as illustrated in FIG. 5B. For this example, if K–4, the ARBTM 406 may execute runs m through m–3, and the may derive a density value as follows:

$D_{n,4}(T_1)=0.88$ $D_{n,4}(T_2)=1.0$ $D_{n,4}(T_3)=0.27$ $D_{n,4}(T_4)=0.36$ $D_{n,4}(T_5)=0.64$ $D_{n,4}(T_6)=0.88$

From the above values, the ARBTM 406 may derive the following prioritized set of tests, sorted in descending order:

$D=\{T_2,T_1,T_6,T_5,T_4,T_3\}$

Considering the above-derived set, the ARBTM 406 may generate a result that since T2 has failed consistently most recently, T2 should be tested first. Then, since T1 and T6 have failed in the two most recent runs, these tests (T1, T6) should be tested second. Since T5 failed in the most recent build, it has a higher weight than T3 and T4. Then, considering T3 and T4, the ARBTM 406 can, despite having the same run history for the past 2 runs, generate a result that T4 has a higher weight since it has simply failed more during the k=4 runs.

According to exemplary embodiments, the following steps may be implemented by the ARBTM 406 to compute: $D_{n,4}(T_1)=0.88$, but the disclosure is not limited thereto.

First, the ARBTM 406 utilizes initial weight vector:

$W=\{1,2,3,4\}$

Next, the ARBTM 406 applies softmax to W to get W':

$W'=\{0.0320586, 0.08714432, 0.23688282, 0.64391426\}$

Next, the ARBTM 406 defines the pass/fail indicator vector X:

$X=\{0,0,1,1\}$

Here, for run $R_{m-3}$ and $R_{m-2}$, the respective indices of X are 0 since $T_1$ passed and for runs $R_{m-1}$ and $R_m$, the last two indices are 1 since $T_1$ failed.

Next, the ARBTM 406 computes the entry-wise product of W'' and X to yield final weight vector W''' as follows:

$W'''=\{0,0,0.23688282, 0.64391426\}$

Finally, the ARBTM 406 computes the sum of W''' to get the final density value for $T_1$ considering k=4 runs. $\Sigma W'''=0.88$. Therefore, $D_{n,4}(T_1)=0.88$.

Point 3: Failure rates may prove to be higher for longer running tests.

The more dependent a test is on the environment it runs in—databases, messaging busses, file systems, external services, etc.—the more opportunities it has to fail. Such comprehensive test runs orders of magnitude longer than a test that uses mocked objects, in-memory stores, and service contracts. As a result, if the prioritization algorithm in Point 2 is applied to the entire universe of tests, the ARBTM 406 may prioritize running long-running tests. On one hand, the CI testing model may require the ARBTM 406 to apply the algorithm to the build and post-deploy phases separately and calculate S for two distinct sets—unit and integration tests, letting one to evade the issue. On the other, one would like to highlight definite opportunities to cut tests maintenance and execution costs by refactoring.

Figure 6:
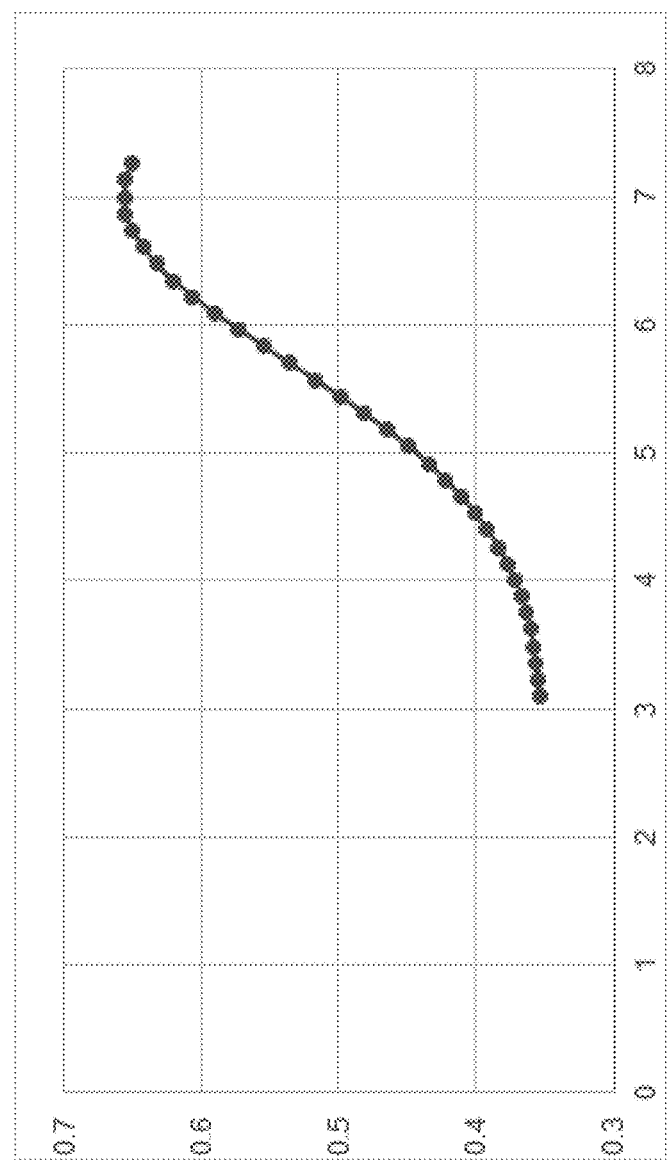
FIG. 6 illustrates a scatter chart displaying relationship between a test's failure rate and its execution time in accordance with an exemplary embodiment.

FIG. 6 illustrates a relationship between a test's failure rate $F_T$ and its execution time as a scatter chart 600.

Point 4: Frequently modified source files are more often to cause previously passing tests to fail.

The very need to keep modifying the same file may indicate an opportunity to redesign or a need to reflect a frequently changing requirement. For example, a relationship R between the total number of times the file has been changed and the number of times the file change introduced new test failures may be represented by the ARBTM 406 as follows:

$$R = \frac{m_n}{M_n}$$

Where $M_n$ is the total number of files modified n times and $m_n$ is the number of files modified n times that caused at least one test to transition from Passed to Failed state. The correlation may become stronger with time as the number of runs, and therefore, change sets may grow.

According to exemplary embodiments, the ARBTM 406 may be configured to measure the relationship between the number of file changes and the transition of tests from Failed to Passed state. It may be expected that the file set that contributed to the Failed-to-Passed change largely intersect with the set that contributed to the Passed-to-Failed transition since developers' natural reaction to a failed test would be to make more changes to the file or related files that caused the failure in the first place.

The established relationship provided by the ARBTM 406 may allow prioritizing execution of such tests every time the "breaker" file is encountered in a change set.

To reduce rework, the ARBTM 406 may be configured to generate notifications for developers and at the time of peer reviews asking to take pre-emptive measures. An example would be "You are modifying a file that was modified 10 times in the past week. The probability that you will cause a test break is 83%." but the disclosure is not limited thereto.

Point 5: Files modified by more than one author within a short time span are more likely to cause breakages compared to a single author's changes.

This may happen if developers do not understand each other's code well and, as a result, introduce fragile changes.

According to exemplary embodiments, the ARBTM 406 may determine how probability of a test break depends on the time elapsed between changes authored by different developers. The ARBTM 406 may be configured to calculate the test failure rate R for each file by calculating the number of times its change set caused breakage m in relation to the overall number of its change sets M as follows:

$$R = \frac{m}{M}$$

and express the relationship between the total change time and R for a fixed number of authors.

Figure 7A:
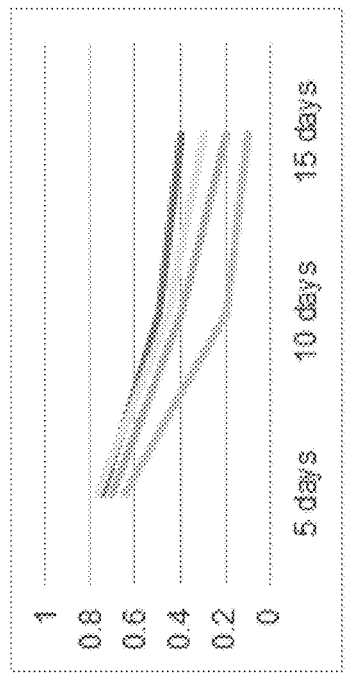
FIG. 7A illustrates a line graph displaying a relationship among multiple developers for test failure rates in accordance with an exemplary embodiment.

For example, for files authored by three developers, a linear graph 700A that expresses the relationship is illustrated in FIG. 7A. As illustrated in FIG. 7A, the vertical axis depicts the test failure rate R, the horizontal axis plots time between changes, and each line represents a file of the same language or type.

Figure 7B:
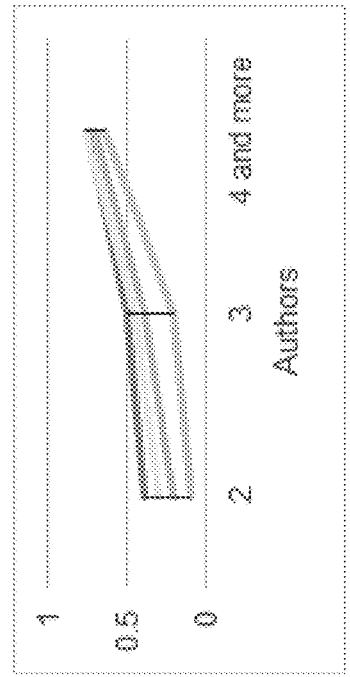
FIG. 7B illustrates another line graph displaying an impact of number of authors on stability of a change within a set time frame in accordance with an exemplary embodiment.

According to exemplary embodiments, the ARBTM 406 may also be configured to inspect the inverse relationship. For example, as illustrated in FIG. 7B, the line graph 700B illustrates the impact of number of authors on the stability of a change within a set time frame. Thus, the ARBTM 406 may be configured to generate a notification to the developer and reviewers with "You are 97% likely to cause a breakage because you are editing a file modified by 15 other developers in the last 30 days. We recommend thorough pre-commit testing and review," but the disclosure is not limited thereto.

Point 6: Certain authors are more likely to cause breakages. If one traces test outcomes to the change-set authors, one may find that some developers are more prone to cause breakages either because of their coding practices or the complexity of the code they develop. Thus, according to exemplary embodiments, the ARBTM 406 may be configured to define an author's failure score L as the number of times the author caused new tests to fail, $a_n$, and the total number of times the author committed the changes, $A_n$. The ARBTM 406 may calculate L per code base—a repository, in this example—since the code quality depends on its author's knowledge of language, familiarity with the code base, understanding of domain where the code is applied, and other factors as follows.

$$L = \frac{a_n}{A_n}$$

Figures 8, 9:
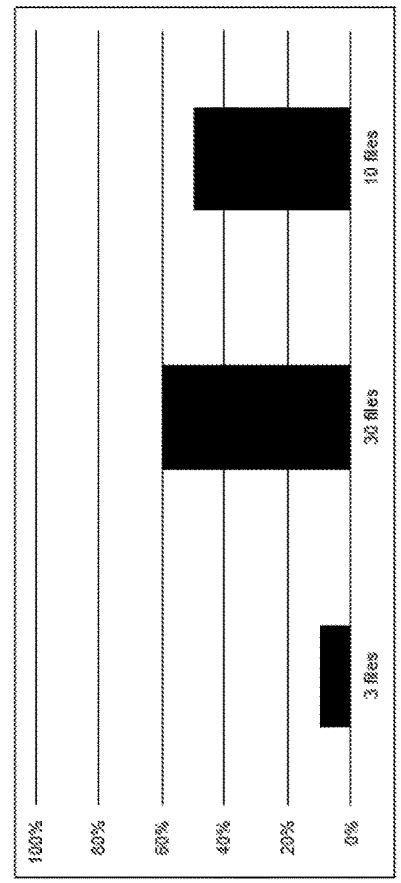
FIG. 8 illustrates an exemplary table listing corresponding failure score of an author in accordance with an exemplary embodiment.
FIG. 9 illustrates a relationship graph between a change set size and a test failure rate in accordance with an exemplary embodiment.

For example, FIG. 8, illustrates a table 900 listing corresponding failure score L of an author. To help developers whose failure score is above 50% to improve, the ARBTM 406 may be configured to issue notifications and at the time of peer reviews asking to take pre-emptive measures. An example would be "You are 50% likely to cause test failures based on your development history in this code base. We recommend an additional pre-commit testing and a thorough peer review." but the disclosure is not limited thereto.

Similarly, to limit input from reviewers whose failure score is above 50%, the ARBTM 406 may be configured to display onto a GUI their scores to the authors during peer reviews: "Author_1 may not be the best reviewer because his personal failure rate in this code base is 75%." but the disclosure is not limited thereto.

Point 7: Commits with a large number of files are more likely to cause breakage compared to commits with small number of files.

Thus, according to exemplary embodiments, the ARBTM 406 may be configured to determine how probability of a test break depends on the number of files submitted for validation in CI. For example, the ARBTM 406 may calculate the test failure rate R for a change set of a fixed size by calculating the number of times it caused breakage m in relation to the overall number of change sets M of the same size as follows:

$$R = \frac{m}{M}$$

FIG. 9 illustrates the relationship graph 900 between the change set size and R, where the vertical axis depicts the test failure rate R in percent, and the horizontal axis plots the change set size. The ARBTM 406 may be configured to issue notifications for developers: "You've reached the change set size 10 safety threshold increasing the probability of test failures form 30 to 50%. We recommend you test, commit, and integrate your changes now," but the disclosure is not limited thereto.

Figure 10:
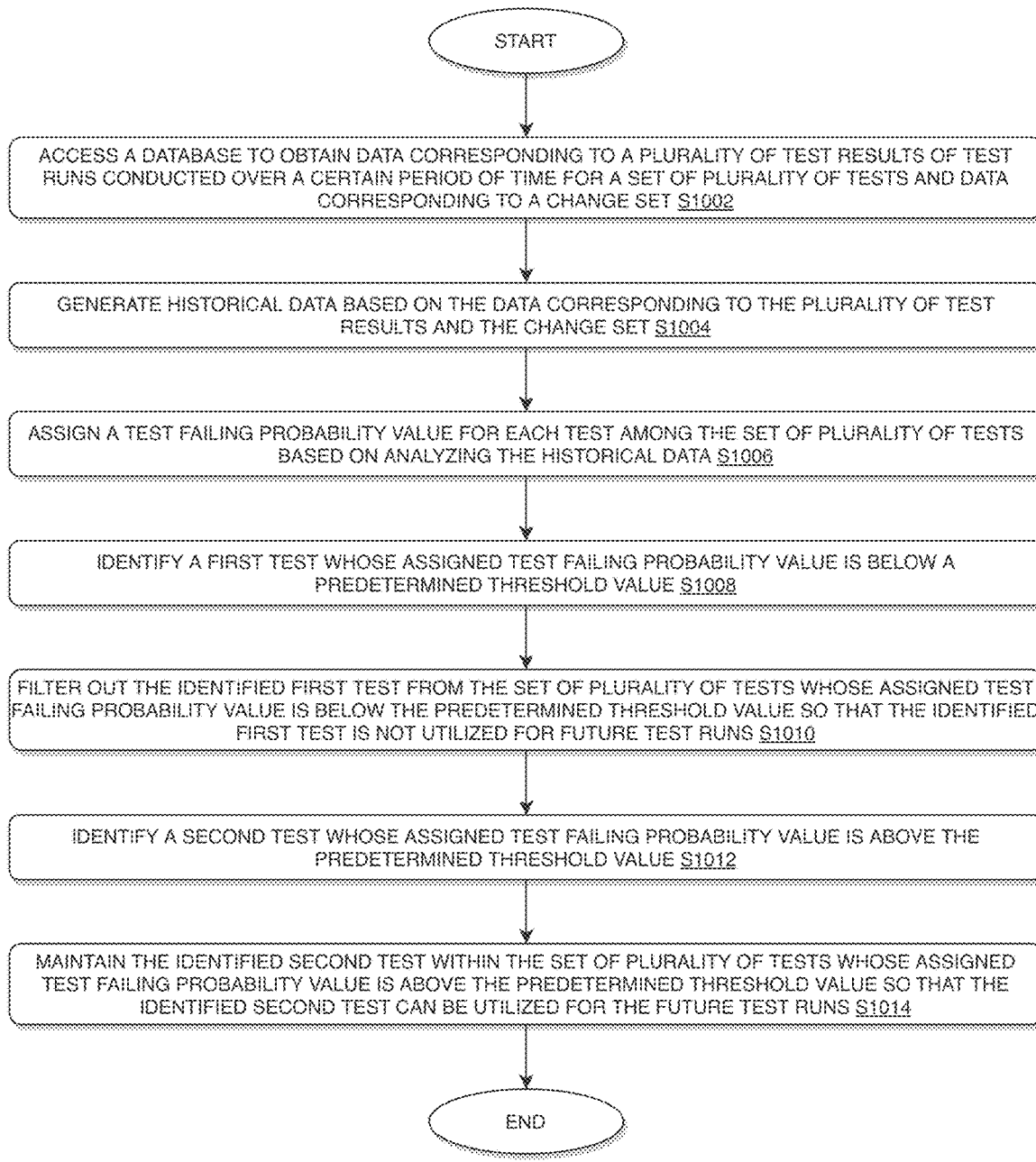
FIG. 10 illustrates a flow diagram for implementing an automatic risk-based testing module in accordance with an exemplary embodiment.

FIG. 10 illustrates a flow diagram for implementing an automatic risk-based testing module for automatic risk-based testing of an application by utilizing one or more processors and one or memories in accordance with an exemplary embodiment.

In the process 1000 of FIG. 10, at step S1002, a database may be accessed to obtain data corresponding to a plurality of test results of test runs conducted over a certain period of time for a set of plurality of tests and data corresponding to a change set.

At step S1004, historical data may be generated based on the data corresponding to the plurality of test results and the change set.

At step S1006, a test failing probability value may be assigned for each test among the set of plurality of tests based on analyzing the historical data.

At step S1008, a first test may be identified whose assigned test failing probability value is below a predetermined threshold value.

At step S1010, the process 1000 may include filtering out the identified first test from the set of plurality of tests whose assigned test failing probability value is below the predetermined threshold value so that the identified first test is not utilized for future test runs.

At step S1012, a second test may be identified whose assigned test failing probability value is above the predetermined threshold value.

At step S1014, the process 1000 may include: maintaining the identified second test within the set of plurality of tests whose assigned test failing probability value is above the predetermined threshold value so that the identified second test can be utilized for the future test runs.

According to exemplary embodiments, the process 1000 may further include: identifying a plurality of second tests each of whose assigned test failing probability value is above the predetermined threshold value; assigning a priority value to each test of the plurality of second tests, wherein the priority value is proportional to corresponding failure rate of each test of the plurality of second tests within the test runs conducted over the certain period of time; and running, for the future test runs, each test of the plurality of second tests according to an order of assigned priority value.

According to exemplary embodiments, the process 1000 may further include: running first, for the future test runs, the test of the plurality of second tests whose assigned priority value is the highest, and running last, for the future test runs, the test of the plurality of second tests whose assigned priority value is the lowest.

According to exemplary embodiments, the process 1000 further include: identifying a plurality of first tests whose assigned test failing probability value is approximately zero; and filtering out the identified plurality of first tests from the set of plurality of tests whose assigned test failing probability value is approximately zero so that the identified plurality of first tests are not utilized for the future test runs.

According to exemplary embodiments, a non-transitory computer readable medium may be configured to store instructions for automatic risk-based testing of an application. According to exemplary embodiments, the instructions, when executed, may cause a processor embedded within the ARBTM 406 or the ARBTD 402 to perform the following: accessing a database to obtain data corresponding to a plurality of test results of test runs conducted over a certain period of time for a set of plurality of tests and data corresponding to a change set; generating historical data based on the data corresponding to the plurality of test results and the change set, assigning a test failing probability value for each test among the set of plurality of tests based on analyzing the historical data, identifying a first test whose assigned test failing probability value is below a predetermined threshold value; and filtering out the identified first test from the set of plurality of tests whose assigned test failing probability value is below the predetermined threshold value so that the identified first test is not utilized for future test runs. The processor may be the same or similar to the processor 104 as illustrated in FIG. 1 or the processor embedded within ARBTD 202, ARBTD 302, ARBTM 306, ARBTD 402, and ARBTM 406.

According to exemplary embodiments, the instructions, when executed, may further cause the processor 104 to perform the following: identifying a second test whose assigned test failing probability value is above the predetermined threshold value; and maintaining the identified second test within the set of plurality of tests whose assigned test failing probability value is above the predetermined threshold value so that the identified second test can be utilized for the future test runs.

According to exemplary embodiments, the instructions, when executed, may further cause the processor 104 to perform the following: identifying a plurality of second tests each of whose assigned test failing probability value is above the predetermined threshold value; assigning a priority value to each test of the plurality of second tests, wherein the priority value is proportional to corresponding failure rate of each test of the plurality of second tests within the test runs conducted over the certain period of time; and running, for the future test runs, each test of the plurality of second tests according to an order of assigned priority value.

According to exemplary embodiments, the instructions, when executed, may further cause the processor 104 to perform the following: running first, for the future test runs, the test of the plurality of second tests whose assigned priority value is the highest; and running last, for the future test runs, the test of the plurality of second tests whose assigned priority value is the lowest.

According to exemplary embodiments, the instructions, when executed, may further cause the processor 104 to perform the following: identifying a plurality of first tests whose assigned test failing probability value is approximately zero; and filtering out the identified plurality of first tests from the set of plurality of tests whose assigned test failing probability value is approximately zero so that the identified plurality of first tests are not utilized for the future test runs.

According to exemplary embodiments as disclosed above in FIGS. 1-10, technical improvements effected by the instant disclosure may include platforms for implementing an automatic risk-based testing module for determining tests that have never failed in a sufficiently large amount of executions and exclude them from functional testing in CI, thereby enabling test execution—particularly post-unit-test—in CI by reducing test turnaround time and saving computational resources, but the disclosure is not limited thereto. According to exemplary embodiments as disclosed above in FIGS. 1-10, technical improvements effected by the instant disclosure may further include platforms for implementing an automatic risk-based testing module that provides exclusionary analysis based on test effectiveness to limit regressive testing for streamlining testing in continuous delivery, but the disclosure is not limited thereto. According to exemplary embodiments as disclosed above in FIGS. 1-10, technical improvements effected by the instant disclosure may further include platforms for facilitating continuous delivery by only running the regressions tests that are pertinent to the platform that have a probability of failure greater than zero (0), thereby making the regression testing possible in continuous delivery, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for risk-based testing of an application by utilizing one or more processors and one or more memories, the method comprising:
    accessing a database to obtain data corresponding to a plurality of test results of test runs conducted over a certain period of time for a set of plurality of tests and data corresponding to a change set;
    generating historical data based on the data corresponding to the plurality of test results and the change set;
    assigning a test failing probability value for each test among the set of plurality of tests based on analyzing the historical data;
    identifying a first test whose assigned test failing probability value is below a predetermined threshold value;
    filtering out the identified first test from the set of plurality of tests whose assigned test failing probability value is below the predetermined threshold value so that the identified first test is not utilized for future test runs;
    identifying a second test whose assigned test failing probability value is above the predetermined threshold value;
    maintaining the identified second test within the set of plurality of tests whose assigned test failing probability value is above the predetermined threshold value so that the identified second test can be utilized for the future test runs;
    identifying a plurality of second tests each of whose assigned test failing probability value is above the predetermined threshold value;
    assigning a priority value to each test of the plurality of second tests, wherein the priority value is proportional to corresponding failure rate of each test of the plurality of second tests within the test runs conducted over the certain period of time;

running, for the future test runs, each test of the plurality of second tests according to an order of assigned priority value;

projecting a pass/fail vector onto a normalized weight vector to only pull out weight values for test runs which have failed;

discarding or penalizing for passed test cases while retaining a relationship that test runs which failed longer in the past should have less weight than those which have failed more recently;

identifying a plurality of first tests whose assigned test failing probability value is zero;

filtering out the identified plurality of first tests from the set of plurality of tests whose assigned test failing probability value is zero so that the identified plurality of first tests are not utilized for the future test runs; and running regression testing for the future test runs only for the identified plurality of second tests that have a probability of failure greater than zero and not running the identified plurality of first tests whose assigned test failing probability value is zero for the future test runs, thereby executing the regression testing in continuous delivery.

2. The method according to claim 1, further comprising:
running first, for the future test runs, the test of the plurality of second tests whose assigned priority value is the highest; and
running last, for the future test runs, the test of the plurality of second tests whose assigned priority value is the lowest.

3. The method according to claim 1, wherein the data corresponding to the plurality of test results of the test runs include one or more of the following data: stack traces and execution times, types of test runners, and programming language of the tests.

4. The method according to claim 1, wherein the data corresponding to the change set includes one or more of the following: file names, commit types, and authors.

5. A system for risk-based testing, comprising:
a database that stores data corresponding to a plurality of test results of test runs conducted over a certain period of time for a set of plurality of tests and data corresponding to a change set; and
a processor operatively connected with the database via a communication network, wherein the processor is configured to:
  access the database to obtain the data corresponding to the plurality of test results of test runs conducted over the certain period of time for the set of plurality of tests and the data corresponding to the change set;
  generate historical data based on the data corresponding to the plurality of test results and the change set;
  assign a test failing probability value for each test among the set of plurality of tests based on analyzing the historical data;
  identify a first test whose assigned test failing probability value is below a predetermined threshold value;
  filter out the identified first test from the set of plurality of tests whose assigned test failing probability value is below the predetermined threshold value so that the identified first test is not utilized for future test runs;
  identify a second test whose assigned test failing probability value is above the predetermined threshold value;
  maintain the identified second test within the set of plurality of tests whose assigned test failing probability value is above the predetermined threshold value so that the identified second test can be utilized for the future test runs;
  identify a plurality of second tests each of whose assigned test failing probability value is above the predetermined threshold value;
  assign a priority value to each test of the plurality of second tests, wherein the priority value is proportional to corresponding failure rate of each test of the plurality of second tests within the test runs conducted over the certain period of time;
  run, for the future test runs, each test of the plurality of second tests according to an order of assigned priority value;
  project a pass/fail vector onto a normalized weight vector to only pull out weight values for test runs which have failed;
  discard or penalize for passed test cases while retaining a relationship that test runs which failed longer in the past should have less weight than those which have failed more recently;
  identify a plurality of first tests whose assigned test failing probability value is zero;
  filter out the identified plurality of first tests from the set of plurality of tests whose assigned test failing probability value is zero so that the identified plurality of first tests are not utilized for the future test runs; and
  run regression testing for the future test runs only for the identified plurality of second tests that have a probability of failure greater than zero and not running the identified plurality of first tests whose assigned test failing probability value is zero for the future test runs, thereby executing the regression testing in continuous delivery.

6. The system according to claim 5, wherein the processor is further configured to:
run first, for the future test runs, the test of the plurality of second tests whose assigned priority value is the highest; and
run last, for the future test runs, the test of the plurality of second tests whose assigned priority value is the lowest.

7. The system according to claim 5, wherein the data corresponding to the plurality of test results of the test runs include one or more of the following data: stack traces and execution times, types of test runners, and programming language of the tests.

8. The system according to claim 5, wherein the data corresponding to the change set includes one or more of the following: file names, commit types, and authors.

9. A non-transitory computer readable medium storing instructions for risk-based testing of an application, wherein when executed, the instructions cause a processor to perform the following:
accessing a database to obtain data corresponding to a plurality of test results of test runs conducted over a certain period of time for a set of plurality of tests and data corresponding to a change set;
generating historical data based on the data corresponding to the plurality of test results and the change set;

assigning a test failing probability value for each test among the set of plurality of tests based on analyzing the historical data;

identifying a first test whose assigned test failing probability value is below a predetermined threshold value;

filtering out the identified first test from the set of plurality of tests whose assigned test failing probability value is below the predetermined threshold value so that the identified first test is not utilized for future test runs:

identifying a second test whose assigned test failing probability value is above the predetermined threshold value;

maintaining the identified second test within the set of plurality of tests whose assigned test failing probability value is above the predetermined threshold value so that the identified second test can be utilized for the future test runs:

identifying a plurality of second tests each of whose assigned test failing probability value is above the predetermined threshold value;

assigning a priority value to each test of the plurality of second tests, wherein the priority value is proportional to corresponding failure rate of each test of the plurality of second tests within the test runs conducted over the certain period of time;

running, for the future test runs, each test of the plurality of second tests according to an order of assigned priority value;

projecting a pass/fail vector onto a normalized weight vector to only pull out weight values for test runs which have failed; and discarding or penalizing for passed test cases while retaining a relationship that test runs which failed longer in the past should have less weight than those which have failed more recently identifying a plurality of first tests whose assigned test failing probability value is zero;

filtering out the identified plurality of first tests from the set of plurality of tests whose assigned test failing probability value is zero so that the identified plurality of first tests are not utilized for the future test runs; and running regression testing for the future test runs only for the identified plurality of second tests that have a probability of failure greater than zero and not running the identified plurality of first tests whose assigned test failing probability value is zero for the future test runs, thereby executing the regression testing in continuous delivery.

10. The non-transitory computer readable medium according to claim 9, wherein when executed, the instructions further cause the processor to perform the following:

running first, for the future test runs, the test of the plurality of second tests whose assigned priority value is the highest; and running last, for the future test runs, the test of the plurality of second tests whose assigned priority value is the lowest.

11. The non-transitory computer readable medium according to claim 9, wherein the data corresponding to the plurality of test results of the test runs include one or more of the following data: stack traces and execution times, types of test runners, and programming language of the tests, and wherein the data corresponding to the change set includes one or more of the following: file names, commit types, and authors.

\* \* \* \* \*